United States Patent
Kawashima

(10) Patent No.: US 8,783,958 B2
(45) Date of Patent: Jul. 22, 2014

(54) ROLLING DEVICE AND USING METHOD THEREOF

(75) Inventor: Sosuke Kawashima, Fujisawa (JP)

(73) Assignee: Coo Space Co., Ltd., Kanagawa (JP)

( * ) Notice: Subject to any disclaimer, the term of this patent is extended or adjusted under 35 U.S.C. 154(b) by 450 days.

(21) Appl. No.: 12/600,000

(22) PCT Filed: May 2, 2008

(86) PCT No.: PCT/JP2008/058415
§ 371 (c)(1),
(2), (4) Date: Nov. 13, 2009

(87) PCT Pub. No.: WO2008/139972
PCT Pub. Date: Nov. 20, 2008

(65) Prior Publication Data
US 2010/0226603 A1 Sep. 9, 2010

(30) Foreign Application Priority Data
May 15, 2007 (JP) .................................. 2007-128748

(51) Int. Cl.
*F16C 19/50* (2006.01)
*F16C 19/24* (2006.01)

(52) U.S. Cl.
USPC ............................................. 384/451; 384/548

(58) Field of Classification Search
USPC ............. 384/17, 19, 43–45, 50, 55, 451, 490, 384/513, 516, 548, 550, 564, 565, 569, 590, 384/597, 598, 618, 619, 622, 627; 74/424.71, 424.75, 424.81, 424.82, 74/424.86, 424.87, 424.89
See application file for complete search history.

(56) References Cited

U.S. PATENT DOCUMENTS

| | | | | |
|---|---|---|---|---|
| 2,922,681 A * | 1/1960 | Bayre | ........................... | 384/446 |
| 2,983,560 A * | 5/1961 | Pitner | ........................... | 384/548 |
| 3,567,295 A * | 3/1971 | Wilkes | ............................. | 384/44 |
| 3,580,098 A * | 5/1971 | Goad | .......................... | 74/424.87 |
| 3,998,506 A * | 12/1976 | Traut | ........................... | 384/550 |
| 4,040,689 A * | 8/1977 | Stanley | ........................ | 384/550 |
| 4,405,185 A | 9/1983 | Oetjen | | |
| 4,461,518 A * | 7/1984 | Tanaka | ............................ | 384/44 |
| 5,427,458 A * | 6/1995 | Sanchez | ........................ | 384/516 |
| 6,561,698 B1 * | 5/2003 | Pribytkov | ..................... | 384/513 |
| 7,228,751 B2 * | 6/2007 | Nagai et al. | ................ | 74/424.75 |
| 2001/0017062 A1 | 8/2001 | Nishimura et al. | | |

FOREIGN PATENT DOCUMENTS

| | | |
|---|---|---|
| JP | 57001821 | 1/1982 |
| JP | 57124121 | 8/1982 |
| JP | 312617 | 2/1991 |
| JP | 317423 | 2/1991 |
| JP | 08074843 | 3/1996 |
| JP | 09303390 | 11/1997 |
| JP | 2001241527 | 9/2001 |
| JP | 2005163997 | 6/2005 |

* cited by examiner

*Primary Examiner* — James Pilkington
(74) *Attorney, Agent, or Firm* — The Webb Law Firm

(57) ABSTRACT

Intervals are provided between rolling elements in a load area to avoid jostling of rolling elements in a rolling device. A portion of a transfer groove has such a sectional shape as to form a contact point changing path for coming in contact with smaller diameter portions of the rolling elements than outer diameters of the rolling elements to thereby reduce revolution quantities of the rolling elements to bring rolling elements in contact with or close to each other at this portion. Then, when the rolling elements come out of the contact point changing path, the outer diameter portions of the rolling elements come in contact with the transfer groove to thereby increase the revolution quantities of the rolling elements to create intervals between the rolling elements entering the load area.

5 Claims, 11 Drawing Sheets

ROLLING DEVICE AND USING METHOD THEREOF

BACKGROUND OF THE INVENTION

1. Field of the Invention

The present invention relates to an improvement of a rolling device.

2. Description of the Related Art

In a rolling device including a pair of transfer grooves and a plurality of rolling elements inserted between the transfer grooves, individual rolling elements rotate in the same direction, which means that rolling element surfaces adjacent to each other move in opposite directions. As a result, large sliding friction is caused by contact between the rolling elements, if the rolling device does not have a supporting cage.

To ease this problem, it is a common practice to use a supporting cage for retaining the rolling elements at uniform intervals (see Patent Document 1, for example).

Patent Document 1: Japanese Unexamined Patent Publication No. 2005-163997

SUMMARY OF THE INVENTION

However, even if the supporting cage in Patent Document 1 is used, sliding friction is still generated between rolling elements and the supporting cage, which may cause increase in rotary torque and breakage of the supporting cage. Moreover, the supporting cage occupies space, which reduces dimensions of the rolling elements and restricts a load capacity.

To rectify the above-described weaknesses of the conventional art, it is an object of the present invention to provide a rolling device in which intervals are created between rolling elements entering a load area. The above and other objects and novel features of the present invention will become completely clear by the following description read with reference to the accompanying drawings. However, the drawings are merely for the purpose of explanation and are not intended to restrict a scope of description of the present invention.

In order to achieve the above-described object, in accordance with a first aspect of the present invention, there is provided a rolling device including: a transfer path made up of at least a pair of transfer grooves; and a plurality of rolling elements rollably inserted in the transfer path, each of the rolling elements being in a cylindrical, conical, or barrel shape or made up of a combination of these curved faces, wherein an area in which the rolling element comes in contact with only one of the transfer grooves of the transfer path is formed, or an area in which a frictional force acting between one of the transfer grooves of the transfer path and the rolling element is greater than a frictional force acting between the other transfer groove and the rolling element is formed, and this area has a contact point changing path in which a contact radius from a rotation center of the rolling element to a contact point between the one of the transfer grooves and the rolling element is smaller than a contact radius in other area.

In accordance with a second aspect of the present invention, there is provided a rolling device including: a transfer path made up of at least a pair of transfer grooves; a plurality of rolling elements rollably inserted in the transfer path; and a circulating path having opposite ends connected to one of the transfer grooves of the transfer path so that the rolling elements can circulate therein, each of the rolling elements being in a cylindrical, conical, or barrel shape or made up of a combination of these curved faces and the rolling elements in the transfer path being scooped up from one end of the circulating path into the circulating path and returned from the other end of the circulating path into the transfer path, wherein at least one end portion of the circulating path has a contact point changing path in which a contact radius from a rotation center of the rolling element to a contact point with the rolling element is smaller than a contact radius in other area.

In accordance with a third aspect of the present invention, the area of the transfer path in which the frictional force acting between one of the transfer grooves of the transfer path and the rolling element is greater than the frictional force acting between the other transfer groove and the rolling element has smaller rigidity in a direction perpendicular to a transferring direction than rigidity in other part of the transfer path or a greater clearance between the transfer grooves than a clearance in other part to thereby form a no-load area in which the rolling elements are gently pinched between the transfer grooves.

In accordance with a fourth aspect of the present invention, at least one of a contact face of the contact point changing path with the rolling element or a contact face of the rolling element with the contact point changing path has higher surface roughness in a perpendicular direction to a rotating direction of the rolling element than surface roughness in the perpendicular direction to the rotating direction of the rolling element of a contact face of the opposed transfer groove with the rolling element or a contact face of the rolling element with the transfer groove. In accordance with a fifth aspect of the present invention, recessed and protruding teeth to be engaged with each other are formed in the rotating direction of the rolling element on the contact face of the contact point changing path with the rolling element and the contact face of the rolling element with the contact point changing path.

In accordance with a sixth aspect of the present invention, a shape of the contact point changing path in a transferring direction of the rolling element is curved in such a direction that the rolling element comes in contact with an inner face. In accordance with a seventh aspect of the present invention, a ferromagnetic material is used as a material of the rolling element to cause a magnetic force to act on the contact point changing path.

In accordance with an eighth aspect of the present invention, the contact point changing path and each of the rolling elements come in contact with each other at two positions in a direction orthogonal to the transferring direction. In accordance with a ninth aspect of the present invention, with the cylindrical rolling elements and the transfer path for skewing the rolling elements, an outer radius of the curvature is greater than an inner radius out of contact radiuses from a rotation center of the rolling element to two contact points of the contact point changing path with the rolling element.

In accordance with a tenth aspect of the present invention, the device includes a supporting cage having a beam portion with which an outer diameter of the rolling element comes in contact on the contact point changing path. In accordance with an eleventh aspect of the present invention, the device being a thrust roller bearing including the cylindrical rolling elements and the supporting cage having the beam portion with which the outer diameter of the rolling element comes in contact, wherein a rotation axis of the rolling element when the rolling element is in contact with the beam portion of the supporting cage is displaced from a rotation center of the bearing. In accordance with a twelfth aspect of the present invention, the device being a rolling bearing made up of at least an outer ring, an inner ring, a rolling element, and an annular decelerating plate forming the contact point changing path, wherein the decelerating plate is loosely fitted with the outer ring or the inner ring elastically against a normal force.

In accordance with a thirteenth aspect of the present invention, there is provided a method of using a rolling device including a transfer path made up of at least a pair of transfer grooves and a plurality of rolling elements rollably inserted in the transfer path, wherein an area in which the rolling element comes in contact with only one of the transfer grooves of the transfer path is formed, or an area in which a frictional force acting between one of the transfer grooves of the transfer path and the rolling element is greater than a frictional force acting between the other transfer groove and the rolling element is formed, and the transfer grooves are disposed so that a contact radius from a rotation center of the rolling element to a contact point between the one of the transfer grooves and the rolling element in the area is smaller than a contact radius in other area.

According to the present invention, after rolling elements come in contact with each another and intervals between the rolling elements are made uniform on a contact point changing path, predetermined intervals are created and the rolling elements enter a load area. Therefore, jostling of the rolling elements in the load area can be prevented without using the supporting cage and an increase in frictional resistance caused by the jostling can be suppressed. Moreover, space that otherwise would be occupied by the supporting cage can be allocated to the rolling elements to increase the load capacity and the rolling elements are unconstrained by an environment created by a material of the supporting cage. Even if the supporting cage is provided, predetermined intervals are created after the rolling elements come in contact with the supporting cage and intervals between the rolling elements and the supporting cages are made uniform on the contact point changing path. Therefore, positions of the rolling elements with respect to the supporting cage are made uniform and jostling of the rolling elements through the supporting cage can be suppressed.

BRIEF DESCRIPTION OF THE DRAWINGS

FIG. 1b shows a section along line Y-Y in FIG. 1a.

FIG. 3b shows a section along line Y-Y in FIG. 3a.

FIG. 3c shows a section along line Z-Z in FIG. 3a.

DETAILED DESCRIPTION OF THE PREFERRED EMBODIMENTS

Embodiment 1

A rolling device of the present invention will be described below in detail with reference to the accompanying drawings.

Figure 1A:
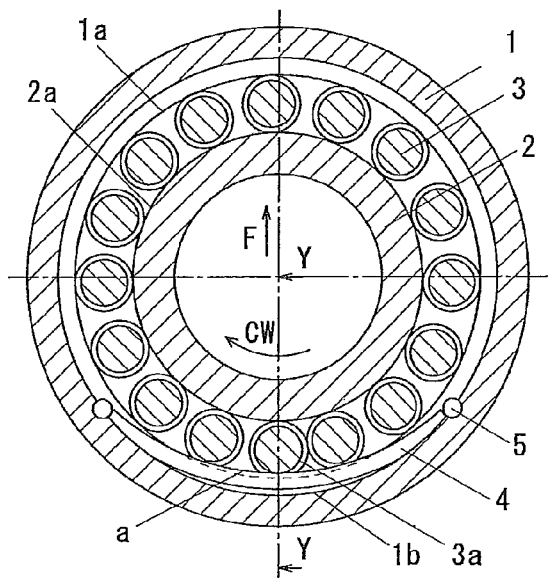
FIG. 1a shows a section of a roller bearing of an embodiment 1 of the present invention along line X-X in FIG. 1b.
Figure 1B:
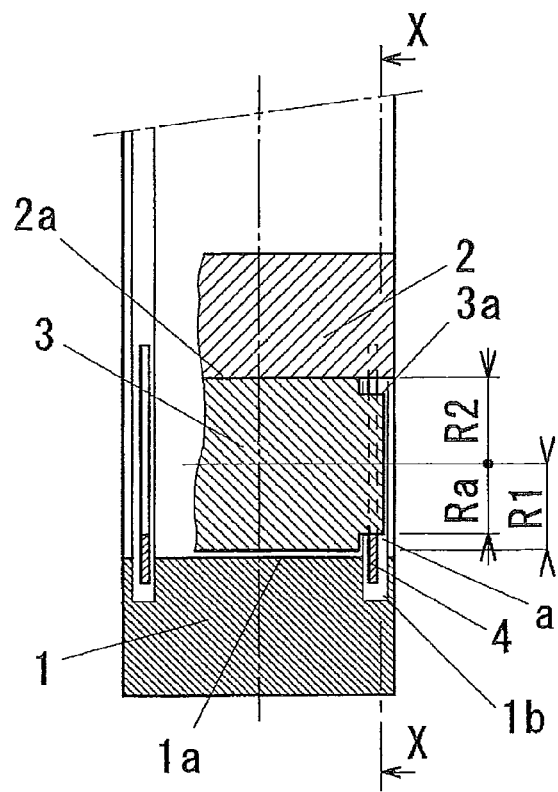

FIGS. 1a and 1b show a roller bearing of an embodiment of the present invention. FIG. 1a is a sectional view along line X-X in FIG. 1b. FIG. 1b is a sectional view along line Y-Y in FIG. 1a. The roller bearing includes an outer ring 1 having a transfer groove 1a, or first transfer groove 1a, on an inner side, an inner ring 2 having a transfer groove 2a, or second transfer groove 2a on an outer side, and a plurality of rollers 3 rollably inserted between the transfer grooves under a pre-load. Each of the rollers 3 is provided at opposite ends thereof with stepped portions 3a having smaller diameters and higher surface roughness in a rotating direction than the transfer groove 2a. The outer ring 1 has grooves 1b on opposite sides of the transfer groove 1a, decelerating plates 4 are fitted in the grooves, and opposite ends of the decelerating plates 4 are restrained with pins 5 driven in the outer ring. Inner ring sides of the decelerating plates 4 are in contact with the stepped portions 3a of the roller and have higher surface roughness in a roller transferring direction than the transfer groove 2a. Moreover, a clearance is left between a central portion of each of the decelerating plates and a bottom portion of the groove 1b so that elasticity of the decelerating plates 4 presses the rollers 3 with a small force (pressing force is not greater than one-twentieth and preferably not greater than one-hundredth dynamic rated load of this bearing, for example).

Next, an operation of the bearing will be described.

If the outer ring 1 is fixed and an upward load F greater than the pre-load is applied to the inner ring 2, upper rollers are in a load area and lower rollers are in a no-load area where the pre-load on the lower roller is canceled by the load F in the figure. In the no-load area, the rollers are pushed up by elasticity of the decelerating plates 4 until outer diameter faces of the rollers come in contact with the transfer groove 2a of the inner ring and at the same time move away from the transfer groove 1a. The contact portions of the decelerating plates 4 with the stepped portions 3a are referred to as a contact point changing path a.

The following equations are for the purpose of facilitating understanding of the present structure. The equations express a concept when the transfer grooves are straight lines and do not restrict a scope of the present embodiment or a scope of the invention.

A revolution quantity of the roller in this structure is expressed by the following equations on the premise that sliding does not occur between the roller and the transfer grooves.

Revolution quantity $Y$[mm] of the roller with respect to the transfer groove $1a = X * R1/(R1+R2)$ Revolution quantity $Ya$[mm] of the roller with respect to the contact point changing path $a = X * Ra/(Ra+R2)$ X: Relative movement distance [mm] between the outer ring 1 and the inner ring 2

R1: Radius [mm] from a rotation center of the roller to a contact point of the roller with the transfer groove 1a R2: Radius [mm] from the rotation center of the roller to a contact point of the roller with the transfer groove 2a Ra: Radius [mm] from the rotation center of the roller to a contact point of the roller with the contact point changing path a From the above equations, the revolution quantities of the roller when a radius of the roller 3 is 1.77 mm, a radius of the stepped portion 3a is 1.25 mm, the outer ring is fixed, and the inner ring is rotated to move a surface of the transfer groove 2a 1 mm are as follows. (1) With respect to the roller in contact with the transfer groove 1a, $$Y=1*1.77/(1.77+1.77)=0.50 \text{ mm}$$

(2) With respect to the roller in contact with the contact point changing path a, $$Ya=1*1.25/(1.25+1.77)=0.41 \text{ mm}$$

It is clear from the above that the revolution quantity of the roller rolling on the contact point changing path a is smaller than that of the roller in the load area.

On the other hand, on a theory that the roller is only in rolling contact with the transfer groove 2a of the inner ring without consideration of a relationship between the contact point changing path a and the roller, the distance R2 between a center of the roller and the contact point of the transfer groove 2a with the roller is constant and the revolution quantity of the roller is constant as well throughout the transfer groove 2a, which is not inconsistent with the above results. In the present structure, however, the surface roughness of the contact point changing path a and the stepped portions 3a of the roller is higher than that of the transfer groove 2a of the inner ring and the outer diameter face of the roller, which causes the transfer groove 2a of the inner ring and the outer diameter face of the roller to slide on each other to thereby reduce the revolution quantity of the roller on the contact point changing path a.

Next, a method of equating intervals between the rollers with a predetermined value will be described.

An interval between the rollers is a product of a relative movement distance X of the transfer grooves after one of the rollers comes out of the contact point changing path and before the next roller comes out of contact point changing path and a difference (Y−Ya) between the revolution quantities for a relative movement distance of 1 mm. A pitch of the rollers in contact with each other in the present example is 3.54 mm which is equal to the diameter of the roller and therefore X mentioned above is twice the diameter, i.e., 7.14 mm.

Therefore, a design interval between the rollers is 7.14 mm×(0.5−0.41)=0.64 mm. However, there are additional factors such as minute sliding due to lubrication conditions and therefore it is preferable to determine the interval by experiment.

The interval between the rollers is set at such a value that the rollers do not come in contact with each other again due to a difference between revolution speeds of the rollers in the load area and is preferably determined by experiment and in consideration of operating conditions. For example, the interval is set at 0.1 mm to 1 mm and 3 mm in a large rolling device. The rollers may not come in contact with each other on the contact point changing path a due to variations in the revolution quantities of the rollers in some cases. However, this is not a problem, although the interval between the rollers entering the load area becomes large.

Although described above is the case where the outer ring 1 is fixed and the inner ring 2 receiving a load in a constant direction rotates, the present invention is not limited thereto. If a centrifugal force acts due to an object and a direction of the centrifugal force rotates, for example, as in the case of fixing an object having a mass with a center deviated from a rotation center, the object is fixed in a lower phase of the outer ring in FIG. 1a so that the inner ring is fixed, and the outer ring is rotated. In this way, forces such as the centrifugal force acting on the outer ring due to the load is in an opposite direction to F in the figure and the contact angle changing path a becomes the no-load area and therefore it is possible to obtain similar effects to those when a direction of the load F does not change. Moreover, even if the outer ring and the inner ring rotate simultaneously, it is similarly possible to create an interval between the rollers coming out of the contact point changing path.

Although a radial clearance (a clearance between the rolling element and an outer face of the inner ring when the rolling element is pushed against an inner face of the outer ring) created by the load F makes the contact angle changing path a the no-load area in this example, the radial clearance may exist when the external load is not applied or the clearance from the ball may be created by forming the contact angle changing path deeper than other portion of the transfer groove in the bearing to which the pre-load is applied.

On the other hand, depending on conditions, e.g., when the load and the pre-load are extremely small, when friction due to the sliding on the contact point changing path is utilized for the purpose of enhancing damping performance of a linear guide, and when sufficient lubricant can be supplied by immersing the contact point changing path in oil or the like, it is also possible not to employ means to reduce rigidity of the contact point changing path a in a direction perpendicular to the roller transferring direction as compared with other portion of the transfer path in a state where the pre-load is applied on every roller, i.e., it is possible not to form the no-load area.

Although the rollers are pressed against the inner ring by elasticity of the decelerating plates 4 in this example, a clearance between the decelerating plates 4 and the stepped portions 3a of the roller may be smaller than a clearance between the outer diameter face of the roller and the transfer groove 1a.

Instead of increasing a coefficient of sliding friction of the contact point changing path a, it is possible to reduce a friction coefficient of the transfer groove facing the contact point changing path by means of applying a coat of a low friction coefficient or the like. Alternatively, the decelerating plates 4 may be formed of permanent magnets to attract a roller made of a ferromagnetic material to thereby increase friction.

Embodiment 2

Figure 2:
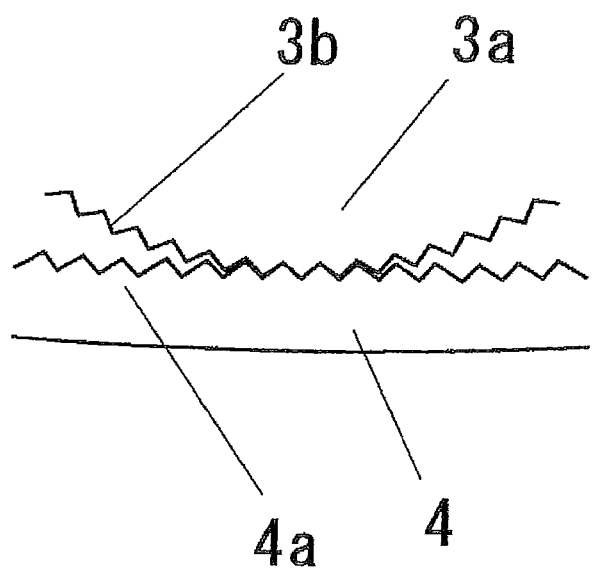
FIG. 2 shows a stepped portion of a roller and a decelerating plate of an embodiment 2 of the present invention.

FIG. 2 is a detailed view of a contact portion between a stepped portion 3a of the roller and a decelerating plate 4 of an embodiment in the present invention and portions not shown in the figure are similar to those in FIG. 1 and not shown.

In the present embodiment, on contact faces of the pair of decelerating plates 4 with the stepped portions 3a and contact faces of the opposite stepped portions 3a with the decelerating plates 4, recessed and protruding teeth 3b and 4a to be engaged with each other are formed in a rotating direction of the rolling element.

A rotation axis of the roller is skewed with respect to a direction perpendicular to a transferring direction by a factor such as a nonuniform external load. Since a large skew angle has an adverse influence such as an increase in a frictional force, a supporting cage is conventionally used to control the skew. In the present embodiment, a revolution phase of the roller entering the contact point changing path can be individually controlled by engagement between the opposed teeth and therefore it is possible to correct the skewed roller to a proper angle as well as to prevent sliding between the decelerating plates 4 and the roller.

However, it is impossible to correct the roller entering with a skew over two or more teeth and therefore it is preferable to determine the pitch of the teeth and the number of decelerating plates 4 to be provided to one bearing in consideration of use conditions and the like. If a portion where the teeth are engaged is a no-load area, it is unnecessary to especially increase surface hardness of the teeth. It is possible to choose low-cost manufacturing methods such as forming of the teeth of the stepped portions 3a of the roller by rolling after removing a hardened surface of the heat-treated roller and forming of the decelerating plates 4 by punching sheet steel or by injection-molding resin.

Embodiment 3

Figure 3A:
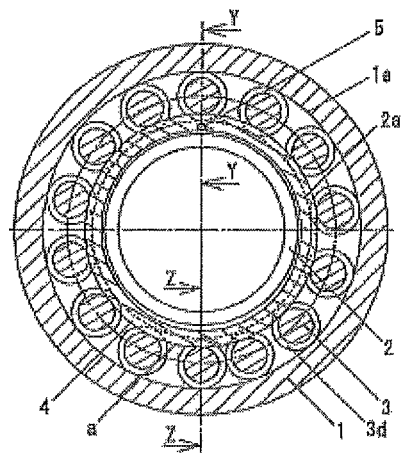
FIG. 3a shows a section of a barrel-shaped roller bearing of an embodiment 3 of the present invention along line X-X in FIG. 3b.
Figure 3B:
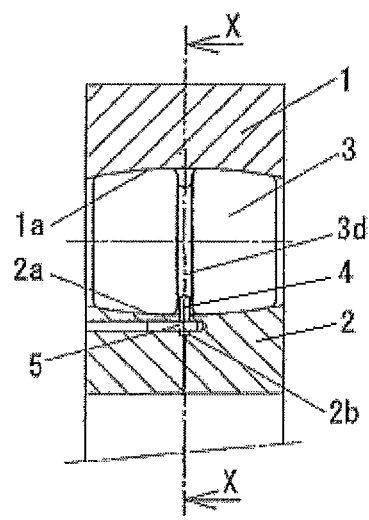
Figure 3C:
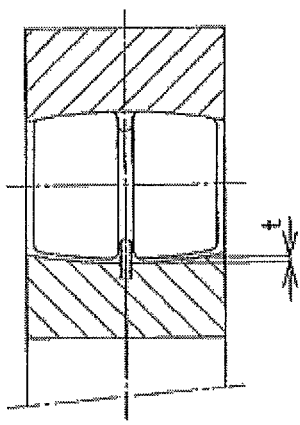

FIGS. 3a to 3c show an embodiment of a barrel-shaped roller bearing of the present invention in which a contact point changing path a is provided to an inner ring. FIG. 3a is a sectional view along line X-X in FIG. 3b, FIG. 3b is a sectional view along line Y-Y in FIG. 3a, and FIG. 3c is a sectional view along line Z-Z in FIG. 3a. At a center of a barrel-shaped roller 3, an annular groove 3d having a rounded groove bottom face is formed. An outer ring 1 has a similar structure to that of the conventional art bearing. The inner ring 2 is divided into two at a center of a transfer groove 2a and an annular groove 2b is formed in a divided face. An annular decelerating plate 4 is mounted in the groove 2b by clearance fitting and a pin 5 driven in the inner ring restrains rotation of the decelerating plate 4.

An outer diameter of the decelerating plate 4 is slightly greater than a diameter of an inscribed circle at the groove bottom of the groove 3b of the roller in a state where an outer diameter of the roller 3 is in contact with the transfer groove 2a of the inner ring and has a rounded face simulating the rounded groove bottom face of the roller. On the other hand, a sufficient clearance is left between an inner diameter of the decelerating plate and a bottom portion of the groove 2b of the inner ring so as to allow deformation of the decelerating plate to such a position that the outer diameter of the rollers 3 comes in contact with the transfer groove 2a of the inner ring. Although the outer ring and the inner ring surround the barrel-shaped roller, it is possible to detach a half of the inner ring to mount the roller 3 and the decelerating plate 4 and many rollers can be mounted.

Next, the operation of the bearing will be described. If an upward load is applied to the inner ring similarly to the embodiment 1, the upper rollers in FIG. 3a are in a load area and therefore the decelerating plate 4 is pushed down by the applied load and the outer diameter portion of the roller comes in contact with the transfer groove 2a of the inner ring and receives the load. Moreover, the rollers in side areas also elastically deform the decelerating plate 4 due to the pre-load and the outer diameter portions of the rollers come in contact with the transfer groove 2a of the inner ring.

In this state, the rollers in these areas and the inner ring are in contact with both of the transfer groove 2a and the decelerating plate 4 (FIG. 3b). Since rigidity of the decelerating plate is low and a reaction force which the rollers receive from the decelerating plate is smaller than that from the transfer groove 2a, the rollers roll on the transfer groove while sliding with contact faces with the decelerating plate.

The sliding on the decelerating plate 4 has only a limited adverse influence (increase in the rolling friction, wear of the contact faces), because the reaction force is small.

On the other hand, the pre-load is not applied on the lower rollers due to the applied load and a pressing force from the decelerating plate 4 creates a clearance t between the roller and the transfer groove 2a (FIG. 3c). Therefore, the roller revolves while sandwiched between the transfer groove 1a of the outer ring and the decelerating plate 4. This portion of the decelerating plate functions as a contact point changing path a. Since the decelerating plate 4 and the groove 3d of the roller are in contact with each other through smaller rounded faces than the barrel shape of the transfer groove 1a, a frictional force is high due to a wedge effect. Therefore, the roller slides on the transfer groove 1a, a revolution quantity of the roller with respect to the inner ring 2 reduces, and the rollers come in contact with each other. If the rollers revolve further and an influence of the applied load reduces, the preload pushes the decelerating plate 4, the outer diameter faces of the rollers come in contact with the transfer groove 2a to increase their revolution quantities, which creates intervals between the rollers.

The present embodiment is characterized in that the position of the contact point changing path changes according to a load direction. For example, in the figure, the decelerating plate 4 is formed on the inner ring and therefore the decelerating plate 4 rotates as the inner ring rotates. However, as long as the applied load is constant, the contact point changing path a is fixed in the position shown in the figure. If the direction of the applied load changes, the contact point changing path a is formed on a portion of the inner ring on an opposite side to the load. Even if the decelerating plate 4 is mounted on the outer ring instead of the inner ring, the decelerating plate 4 functions in the same way.

Embodiment 4

Figure 4:
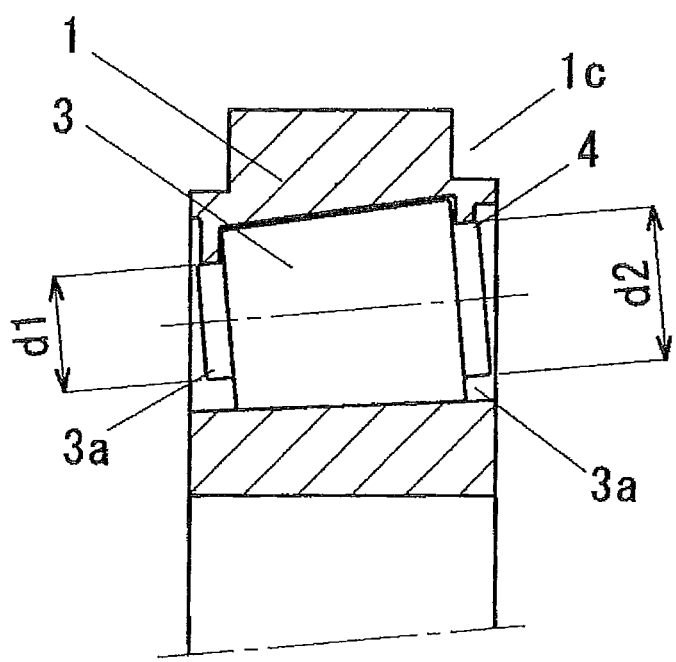
FIG. 4 is a sectional view of a tapered roller bearing of an embodiment 4 of the present invention.

FIG. 4 is a sectional view of an embodiment of the present invention in a tapered roller bearing. According to a difference between left and right diameters of a tapered roller 3, a relationship between diameters of stepped portions 3a formed at opposite ends of the roller is d1<d2. The decelerating plate 4 in the present example is formed integrally as annular beams on opposite side faces of the outer ring 1 and has a function of restraining the roller in a thrust direction as well. An inner diameter of the beams is slightly smaller (by about 5 μm to 100 μm of a radius, for example) only at a portion functioning as a contact point changing path a. At this portion, the roller does not revolve on the transfer groove 1a of the outer ring, but the stepped portions 3a revolve on the contact point changing path. A path of the roller simulates a revolution path set according to taper of an outer diameter of the roller, because the relationship between the diameters of the stepped portions is d1<d2 and therefore a revolution quantity of the portion d1 is smaller than a revolution quantity of the portion d2.

Although the contact point changing path may be directly formed by machining, it is possible to reduce a diameter only at a portion to be deformed if a shape before machining is deformed by applying a tensile load to a portion corresponding to the contact point changing path a to elastically deform the portion or by locally heating the portion to thermally expand the portion during machining of the inner diameter.

Stepped portions 1c are formed at an outer diameter portion of the outer ring 1 to adjust radial rigidity of the beam portion. This is for elastically deforming the beam portion to bring the outer diameter face of the roller into contact with the transfer groove 1a to thereby prevent breakage of the contact point changing path a when an unexpected load acts on the contact point changing path a.

Embodiment 5

Figure 5:
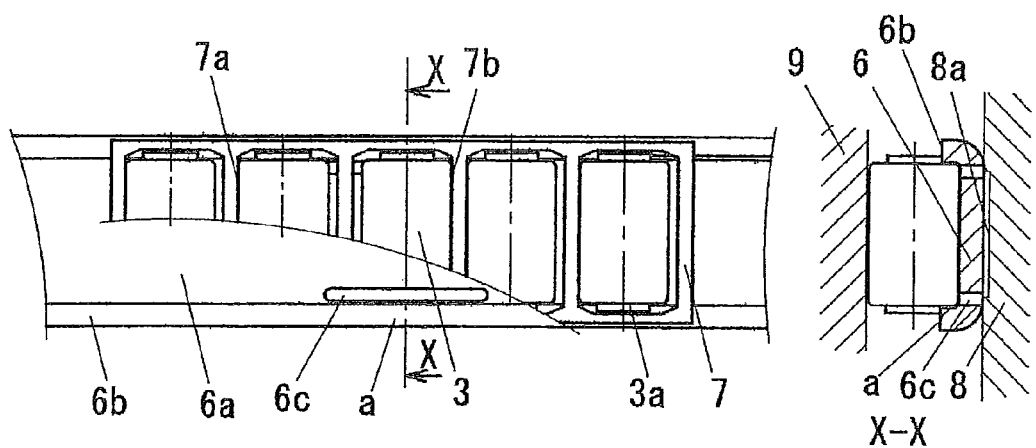
FIG. 5 shows a linear guide of an embodiment 5 of the present invention.

FIG. 5 shows an embodiment of the present invention in a non-circulating linear guide made up of a rail 6 having a U-shaped section, a supporting cage 7, and rollers 3. In use, the linear guide is disposed between a mounting face 8 and a slider 9 that is a transfer face. A bottom face of the U-shaped rail 6 forms a transfer groove 6a and opposite wall portion upper edges 6b having greater surface roughness than the transfer groove 6a are formed. A difference between heights of the wall portion upper edges 6b and the transfer groove 6a is slightly smaller than a difference between radiuses of an outer diameter and stepped portions 3a of the roller 3. Moreover, slits 6c are formed on opposite sides of a central portion of the rail 6 and a back clearance 8a is formed in a portion of the mounting face 8 corresponding to the slits.

The supporting cage has the same number of pockets as the rollers and a clearance in a transferring direction between the pocket and the roller is slightly smaller than the design clearance described in the embodiment 1.

Next, the operation of the bearing will be described. The figure shows a state where the slider is moving from the right side to the left side. The stepped portions 3a of the four rollers at opposite ends are not in contact with the wall portion upper edges 6b of the rail and a load of the slider is received by the transfer groove 6a. On the other hand, a portion shown in an X-X section functions as a contact point changing path a, where the transfer groove 6a slightly bends due to the back clearance 8a and the slits 6c. As a result, the stepped portions 3a of the roller come in contact with the wall portion upper edges 6b of the rail and the roller slides at a contact portion with the transfer groove 6a and rolls on the wall portion upper edges 6b.

While left walls 7a of the pockets of the supporting cage 7 are pushed by the outer diameter portions of the opposite four rollers and move leftward, the central roller revolves at a lower speed and therefore comes in contact with a right wall 7b of the pocket to correct attitudes of the rollers and intervals between the rollers. Then, the roller comes out of the contact point changing path a, accelerates, and moves away from the right wall 7b of the pocket. On the contact point changing path a, the roller does not directly receive the load of the slider due to the back clearance 8a and only receives a reaction force from the transfer groove 6a with rigidity reduced by forming the slits 6c. Therefore, a force necessary for the right wall 7b of the supporting cage to correct the attitudes of the rollers and the intervals between the rollers is small and a strength of the supporting cage need not be extremely high.

With the present structure, skew and a pitch of the rollers during operation are corrected and therefore it is possible to rectify a friction problem due to jostling of the rollers via the supporting cage in the load area and a resultant cage strength problem. The supporting cage is useful in the non-circulating rolling device like the present example, because the rollers need be prevented from falling from the opposite ends and because the rollers at the ends do not have functions of coming in contact with other rollers to maintain a constant pitch of the rollers (there are no rollers to come in contact with) as in the above-described embodiments.

Embodiment 6

Figure 6:
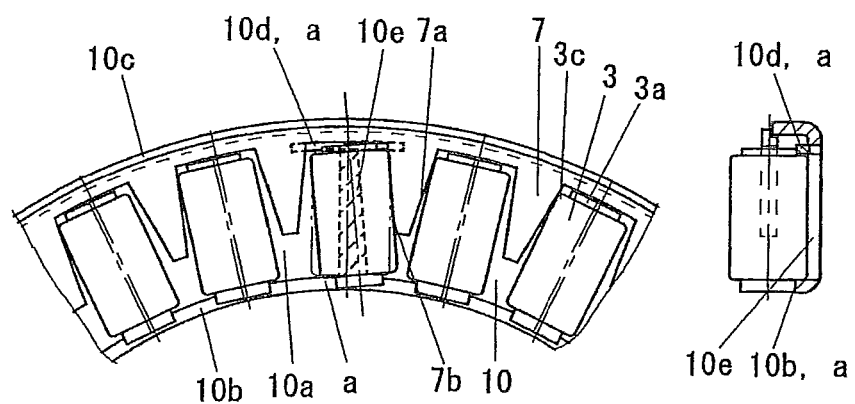
FIG. 6 shows a thrust roller bearing of an embodiment 6 of the present invention.

FIG. 6 shows a thrust roller bearing made up of a lower raceway shaft 10, an upper raceway shaft (not shown), cylindrical rollers 3 having stepped portions 3a formed on opposite sides, and a supporting cage 7, the rollers 3 and the supporting cage 7 inserted between the lower raceway shaft and the upper raceway shaft. The lower raceway shaft 10 has a bottom face functioning as a transfer groove 10a and side walls formed in U shape at opposite sides. The inner diameter side side-wall 10b is formed as a wall for preventing a fall of the roller with an upper edge of the side wall 10b formed close to the stepped portion 3a of the roller and the outer diameter side-side wall 10c functions as a wall for guiding the supporting cage. Moreover, a protrusion 10d close to the stepped portion 3a on a bearing outer diameter side of the roller is molded on the lower raceway shaft below the stepped portion 3a and the transfer groove 10a at this portion is provided with a fan-shaped hole 10e (a hatched portion in the figure) to form a no-load area. The supporting cage 7 is of an annular shape and includes beam portions 7a, 7b for separating the rollers 3 and angles of the beam portions are displaced from angles at which rotation axes of the rollers in contact with the beam portions are aligned with a center of the bearing. The lower raceway shaft 10 is of a shape selected with integral press molding in mind.

Next, operation of the bearing will be described.

In FIG. 6, if the upper raceway shaft (not shown) rotates leftward, the rollers 3 revolve leftward as well and the supporting cage 7 similarly rotates leftward with the beam portions 7a coming in contact with corner portions 3c of the rollers in the load area.

If the roller revolves to the fan-shaped hole 10e of the lower raceway shaft 10, the stepped portions 3a of the roller revolve on the inner diameter side side-wall 10b and the protrusion 10d and function as a contact point changing path a.

The revolution speed of the roller reduces on the contact point changing path and, as a result, the roller is skewed to be at the same angle as the beam portion 7b after the corner portion 3c of the roller comes in contact with the opposite beam portion 7b of the supporting cage 7. This angle is roughly parallel to the normal from the rotation center of the bearing at a position where the roller is about to come out of the contact point changing path a and enter the load area. A raceway path of the thrust roller bearing does not coincide with a revolution path of the rollers when they do not restrain the rollers and therefore the rollers are forcibly skewed by the supporting cage to follow the raceway path. In the present embodiment, however, it is possible to reduce skew in the load area by skewing the rollers in the no-load area.

It is preferable to provide a large number of contact point changing paths. For example, twice the number of contact point changing paths than the rollers may be provided or the contact point changing paths may be provided at every 5-degree phase. The inner diameter side stepped portion 3a of the roller may have a smaller diameter than the outer diameter side stepped portion 3a as shown in the embodiment 4 to facilitate the operation of the skew on the contact point changing path. Moreover, teeth shown in the embodiment 2 may be formed on the stepped portions 3a of the rollers, the inner diameter side upper edge 10b and an upper edge of the protrusion 10d.

Embodiment 7

Figure 7:
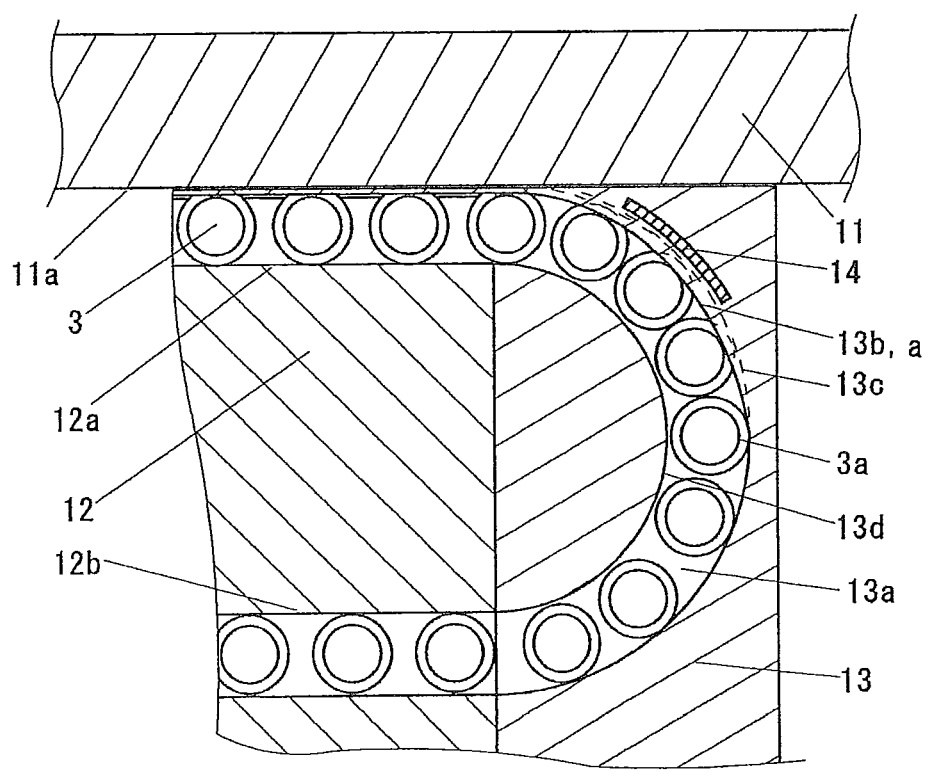
FIG. 7 is a sectional view along a circulating path of a circulating linear guide of an embodiment 7 of the present invention.

FIG. 7 is a sectional view of a portion of a circulating linear guide where the rollers circulate from a no-load area into a load-area, the linear guide formed by inserting a plurality of rollers 3, each having stepped portions 3a on opposite end faces, into a circulating path including the load area made up of a transfer groove 12a of a slider main body 12 and a transfer groove 11a of a rail 11 and the no-load area made up of a return path 12b passing through the slider main body and turnaround paths 13a formed in U shape in end caps 13 fixed to opposite ends of the slider main body.

A general structure of the linear guide of the present embodiment is similar to the structure disclosed in Japanese Unexamined Patent Publication No. 9-303390, for example, and the present invention can be applied similarly to the embodiments described above, because the rollers circulate between the load area and the no-load area. The turnaround path 13a in the end cap 13 is basically a square through hole slightly larger than external dimensions of the roller. However, in a portion close to the load area, a beam portion 13b for coming in contact with the opposite stepped portions 3a of the rollers and having such a dimension that outer diameters of the rollers in contact with the beam portion 13b move away from a path wall outer side 13c is formed and this portion functions as a contact point changing path. Moreover, a magnet 14 is embedded in a position outside the contact point changing path.

For the purpose of preventing the rollers from falling from the slider main body when the rail 11 does not exist, the beam portion 13b is connected to the beam portion (not shown) of the opposite end cap astride the slider main body.

Next, the operation of the present structure will be described. If the rail 11 operates leftward, the rollers 3 in the load area roll leftward, pass through the turnaround path (not shown) in the end cap on the left end and the return path 12b in the slider main body, and are pushed out into the turnaround path 13a in the right end cap. Since contact positions of the rollers in the return path with the path walls are uncertain, rotating directions of the rollers are uncertain as well. However, the rollers in the turnaround path 13a are guided by the path wall outer side 13c due to a centrifugal force and hence rotate in certain directions.

If the rollers further revolve to move away from the path wall outer side 13c and the contact point changing path a comes in contact with the stepped portions 3a of the rollers, contact radiuses of the rollers reduce. As a result, the revolution speeds reduce, the intervals between the rollers reduce, and the rollers come in contact with or come close to each other. At this time, the rotation speeds of the rollers increase. This means that part of revolution energy of the rollers is converted into rotation energy.

If the rollers further revolve to move away from the contact point changing path a to come in contact with the path wall outer side 13c, the contact radiuses of the rollers increase. As a result, part of the rotation energy is converted into the revolution energy. The revolution speeds of the rollers increase to create intervals between the rollers and the rollers enter the load area made up of the transfer grooves 11a and 12a of the rail 11 and the slider main body 12.

Note that the magnet 14 is for bringing the rollers into contact with the contact point changing path a even in the low-speed area where the centrifugal force acting on the rollers is insufficient. In this case, the rollers 3 are made of a ferromagnetic material.

Embodiment 8

Figure 8:
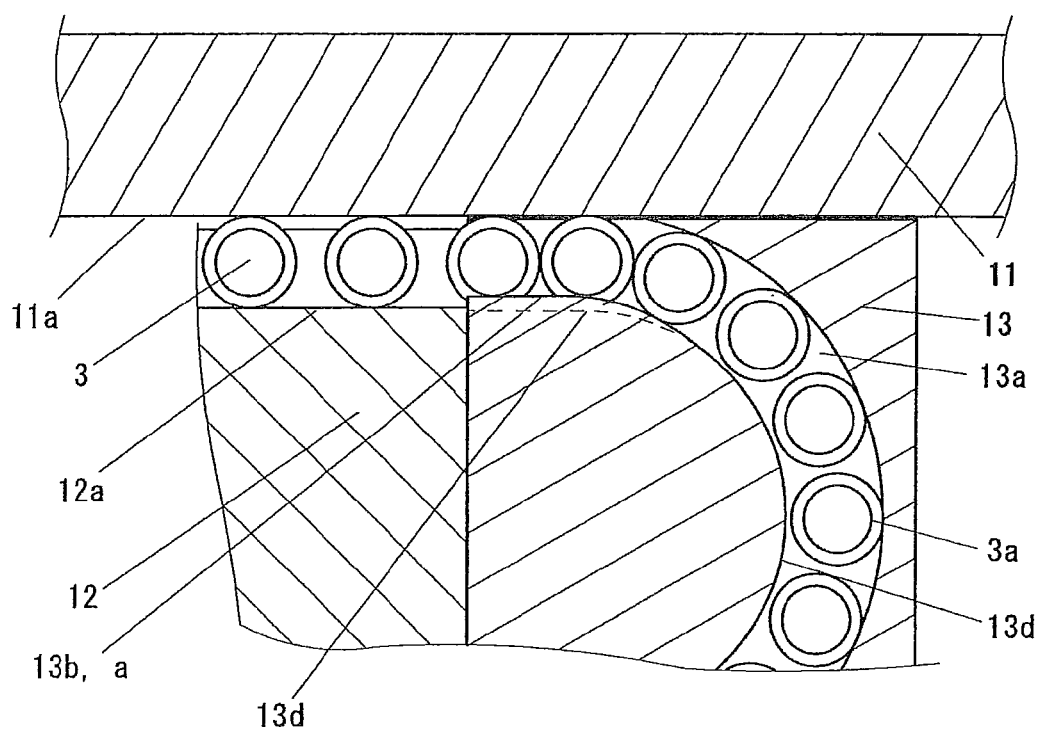
FIG. 8 is a sectional view along a circulating path of a circulating linear guide of an embodiment 8 of the present invention.

FIG. 8 is a sectional view showing another embodiment of a circulating linear guide in the present invention with an area of the portion, where the rollers circulate from the no-load area into the load area, different from the embodiment 7.

At a portion of a path wall inner side 13d of the turnaround path 13a of the end cap 13 close to the rail 11, a beam portion 13b for coming in contact with the opposite stepped portions 3a of the rollers and having such a dimension that outer diameters of the rollers in contact with the beam portion 13b move away from the path wall inner side 13d is formed, and this portion functions as a contact point changing path a. A portion facing the contact point changing path a is the transfer groove 11a of the rail 11. By molding the end cap 13 using material such as resin with low rigidity, the rollers at this portion are elastically pinched. The opposite stepped portions 3a of the rollers have higher surface roughness than the outer diameter faces.

Next, the operation in the present structure will be described. If the rail 11 operates leftward, the rollers 3 in the load area roll leftward, pass through the turnaround path (not shown) in the end cap on the left end and the return path in the slider main body, and are pushed out of the turnaround path 13a in the right end cap into the contact point changing path a.

At an entrance of the contact point changing path a, the rollers 3 revolve leftward while rotating left due to a tangential force received by the rail 11. Since the stepped portions 3a of the rollers have higher surface roughness than the outer diameter faces, the stepped portions 3a decelerate and revolve on the contact pint changing path a while the rollers slide on the rail 11, which brings the rollers into contact with or close to each other.

If the rollers further revolve and enter the load area made up of the transfer grooves of the slider main body 12 and the rail 11, contact points of the rollers change from the beam portion 13b to the transfer groove 12a of the slider main body in contact with the outer diameter faces of the rollers. The revolution speeds of the rollers increase to create intervals between the rollers.

With the present structure, because kinetic energy of the rollers is not utilized as a means for creating the intervals between the rollers unlike the embodiment 7, the operation does not depend on the speed of the rail 6.

The recessed and protruding teeth described in the embodiment 2 may be formed on the stepped portions 3a of the rollers and the beam portion 13b to thereby stabilize attitudes of the rollers entering the load path. In this case, the teeth on the beam portion gradually get engaged deeper. Therefore, even if the rollers are inclined at the beginning of engagement, the teeth get engaged in correct phase and the teeth get deeply engaged before the load area. As a result, backlash reduces and it is possible to properly correct the attitudes of the rollers. Alternatively, the supporting cage described in the embodiment 5 may be mounted in the liner guide to thereby stabilize the attitudes of the rollers entering the load path. A method of mounting the supporting cage in the linear guide is disclosed in Japanese Unexamined Patent Publication No. 9-303390, for example.

Embodiment 9

Figure 9:
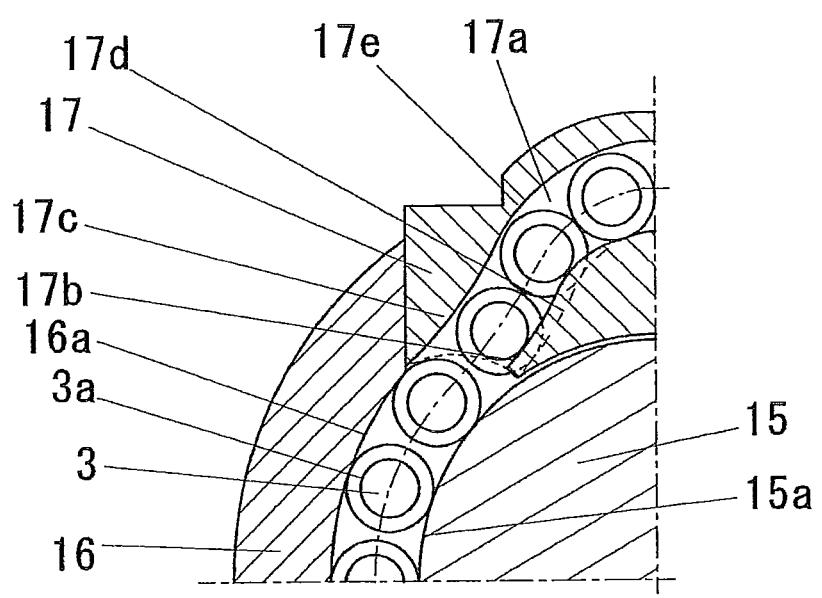
FIG. 9 is a sectional view along a circulating path of a roller screw device of an embodiment 9 of the present invention.

FIG. 9 is a sectional view along a circulating path in a perpendicular direction to rotation axes of rollers of an embodiment of a roller screw device according to the present invention. A general structure of the roller screw is similar to that disclosed in Japanese Unexamined Patent Publication No. 2001-241527, for example, and the figure shows a feature portion of the present invention. The roller screw in the figure is formed by inserting a plurality of rollers 3, each having stepped portions 3a on opposite ends, into a circulating path including a load area made up of spiral transfer grooves 15a and 16a of a screw shaft 15 and a nut 16 and a no-load area made up of a circulating part 17. The present embodiment is the same as the above-described embodiments in that the rollers circulate between the load area and the no-load area and the present invention can be applied to the present embodiment.

In the present embodiment, on a path wall screw shaft side 17*d* of an exit portion of a circulating path 17*a* in the circulating part 17, a beam portion 17*b* for coming in contact with the opposite stepped portions 3*a* of the rollers and having such a dimension that outer diameters of the rollers in contact with the beam portion 17*b* move away from a path wall screw shaft side 17*d* is formed, and this portion functions as a contact point changing path a. The contact point changing path a creates intervals between the rollers entering the load area by conversion of rotation energy and revolution energy of the rollers to and from each other similarly to that in the circulating linear guide in the embodiment 7. In order to bring the rollers in contact with the contact point changing path a with a centrifugal force acting on the rollers and make it difficult for the rollers to come in contact with an opposite path wall 17*c*, this portion is curved in such a direction that the roller comes in contact with an inner face on the contact point changing path a. Moreover, the magnet in the embodiment 7 may be provided in this portion.

Embodiment 10

Figure 10:
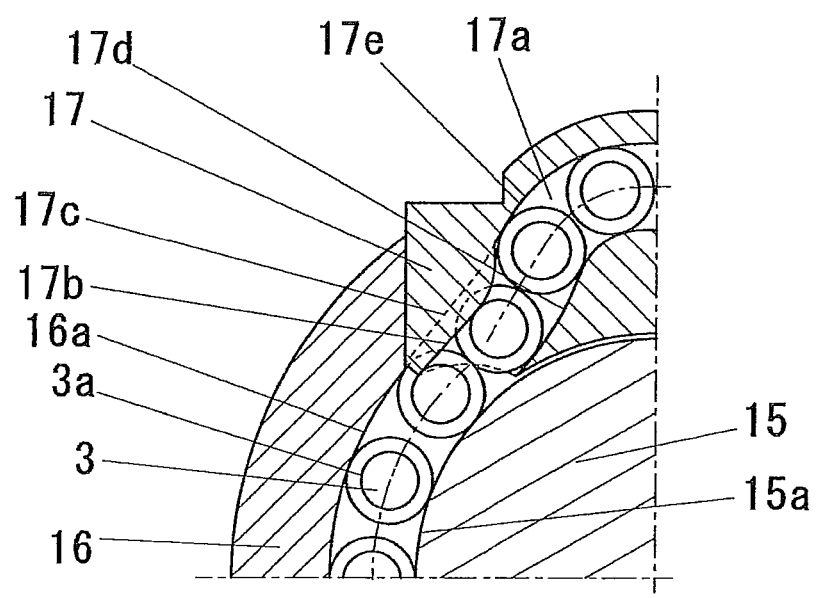
FIG. 10 is a sectional view along a circulating path of a roller screw device of an embodiment 10 of the present invention.

FIG. 10 is a sectional view along a circulating path in a perpendicular direction to rotation axes of rollers of another embodiment of the roller screw device according to the present invention. The present embodiment is different in a contact point changing path a from the embodiment 9.

The contact point changing path a in this example is formed on the outer diameter side path wall 17*c* of the exit portion of the circulating path 17*a* in the circulating part 17. About a half portion on an upper right side in the figure of a transfer face facing the contact point changing path a is an inner diameter side path wall 17*d* of the circulating path and the rest is the transfer groove 15*a* of the screw shaft 15.

The half portion on the circulating part side has a function of converting revolution energy of the rollers into rotation energy similarly as in the roller screw in the embodiment 9 and works effectively mainly in left rotation of the screw shaft at high speed. The rest has a function of causing the transfer groove 15*a* of the screw shaft and the outer diameter faces of the rollers to slide on each other to decelerate the rollers as in the circulating linear guide in the embodiment 8. When the rollers enter the transfer groove 16*a* of the nut from the contact point changing path a, revolution speed (revolution quantities) increase and therefore intervals between the rollers 3 entering the load area increase.

If the device is bilaterally symmetric, a right side (not shown) operates in the same way when the screw shaft turns right. Although the contact point changing path a in the figure is clogged with the rollers when the screw shaft is turning right, it has a small adverse influence, because this portion does not receive a load. Moreover, similarly to the above-described embodiments, it is also possible to employ a magnetic force acting on the contact point changing path a, teeth faces provided on the stepped portions 3*a* of the rollers and the beam portion 17*b* of the circulating path to be engaged with each other, and the supporting cage as well. As is clear from the above-described embodiments, the present invention can be applied to a non-circulating roller screw device as well. In this case, the supporting cage for stringing the rollers out is added to prevent the rollers from falling from end portions.

Although the rolling elements have been described as the rollers in the above embodiments, similar operation and effects can be obtained as well, if the rolling elements are balls. In this case, the balls as the rolling elements are spheres not provided with stepped portions and a position at which the transfer groove comes in contact with the ball (referred to as a contact angle, in general) on the contact point changing path a may be different on other portion.

Embodiment 11

Figure 11:
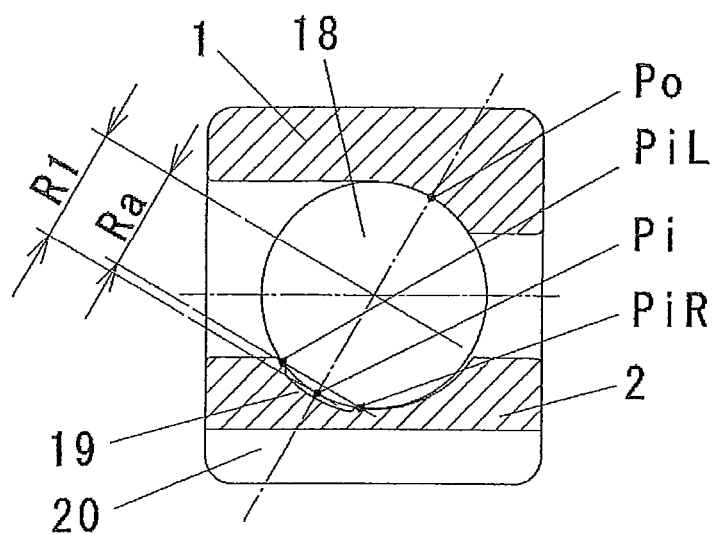
FIG. 11 is a sectional view of an angular ball bearing of an embodiment 11 of the present invention.

FIG. 11 is a sectional view of an embodiment of an angular ball bearing according to the present invention. Normally, the angular ball bearing is a two-point contact bearing in which contact points between a ball and inner and outer rings are inclined with respect to a shaft. The present embodiment employs two-point contact as well, i.e., the outer ring 1 is in contact at a contact point Po throughout its circumference and the inner ring 2 is in contact at a contact point Pi in most of its area. However, in a sectional position in the figure, an escape groove 19 is formed in the inner ring 2 to thereby bring the ball in contact not at Pi but at two points, i.e., PiL and PiR to thereby employ three-point contact including the contact point Po with the outer ring 1.

While a contact radius of the ball with the inner ring is R1 in the portion without the escape groove 19, a contact radius in the position shown in the figure is Ra which is smaller than R1 and the position functions as a contact point changing path. Although the escape groove 19 preferably has such a length that 0.5 to 2 balls are in three-point contact, the length is not limited thereto.

Moreover, an escape groove 20 is also formed in an area of an inner diameter face of the inner ring provided with the escape groove 19 and the inner ring at this portion bends to thereby ease pressure that the contact points PiL and PiR receive from the ball. A total area of surface contact of the contact points PiL and PiR is smaller than an area of surface contact of the opposed contact point Po on the outer ring so that a frictional force received by the ball from the inner ring is greater than that received from the outer ring (the respective contact points have substantial contact areas due to pressure from the ball. A film thickness of a lubricant provided between the inner ring or the outer ring and the ball reduces as the contact area reduces. Therefore, the frictional forces are different).

With the above structure, the present embodiment operates in the same way as the embodiment 1 and can prevent jostling of the balls in the load area.

The present invention can be applied to any rolling device for guiding rolling elements to roll, power transmission, or the like and having rolling elements conducting rolling motion.

The invention claimed is:

1. A rolling device comprising:
    a transfer path made up of at least a first transfer groove and a second transfer groove which move relatively to each other; and
    a plurality of rolling elements rollably inserted in the transfer path, each of the rolling elements being in a cylindrical, conical, or barrel shape or made up of a combination of curved faces, wherein:
    each of the rolling elements has a small diameter portion having a diameter smaller than the diameter of a remaining portion of the rolling elements,
    the transfer path has a contact point changing path at which the first transfer groove partially has an elastic decelerating plate along the transfer direction of the rolling elements, in which the small diameter portion of the rolling elements contacts the decelerating plate, the small diameter portion of each of the rolling elements comes in contact with the decelerating plate and the remaining portion of each of the rolling elements defines a first clearance with the first transfer groove in the contact point changing path, and a second clearance is defined between a central portion of the decelerating late and a bottom portion of a groove so that elasticity of the decelerating plate presses the rolling elements with a force, a frictional force acting between the decelerating plate of the first transfer groove and the small diameter portion of the rolling elements is greater than a frictional force acting between the second transfer groove and the rolling elements, and a radius from a rotation center of each of the rolling elements to a contact point between the decelerating plate and the small diameter portion of each of the rolling elements in the contact point changing path is smaller than a radius from the rotation center of each of the rolling elements to the contact point between the first transfer groove and each of the rolling elements in the remaining area of the transfer path.

2. The rolling device according to claim 1, wherein a shape of the contact point changing path in a transferring direction of the rolling elements is curved in such a direction that the rolling elements come in contact with an inner face.

3. The rolling device according to claim 1, wherein the contact point changing path and each of the rolling elements come in contact with each other at two positions in a direction orthogonal to a transferring direction of the rolling elements.

4. A rolling device comprising:
a transfer path made up of at least a first transfer groove and a second transfer groove which move relatively to each other; and
a plurality of rolling elements rollably inserted in the transfer path, each of the rolling elements being in a cylindrical, conical, or barrel shape or made up of a combination of curved faces, wherein:
each of the rolling elements has a small diameter portion having a diameter smaller than the diameter of a remaining portion of the rolling elements,
the transfer path has a contact point changing path at which the first transfer groove partially has an elastic decelerating plate along the transfer direction of the rolling elements, in which the small diameter portion of the rolling elements contacts the decelerating plate,
the small diameter portion of each of the rolling elements comes in contact with the decelerating plate and the remaining portion of each of the rolling elements defines a first clearance with the first transfer groove in the contact point changing path, and a second clearance is defined between a central portion of the decelerating plate and a bottom portion of a groove so that elasticity of the decelerating plate presses the rolling elements with a force,
a frictional force acting between the decelerating plate of the first transfer groove and the small diameter portion of the rolling elements is greater than a frictional force acting between the second transfer groove and the rolling elements,
a radius from a rotation center of each of the rolling elements to a contact point between the decelerating plate and the small diameter portion of each of the rolling elements in the contact point changing path is smaller than a radius from the rotation center of each of the rolling elements to the contact point between the first transfer groove and each of the rolling elements in the remaining area of the transfer path, and
the decelerating plate has a higher surface roughness than a surface roughness of the second transfer groove.

5. A rolling device comprising:
a transfer path made up of at least a first transfer groove and a second transfer groove which move relatively to each other; and
a plurality of rolling elements rollably inserted in the transfer path, each of the rolling elements being in a cylindrical, conical, or barrel shape or made up of a combination of curved faces, wherein:
each of the rolling elements has a small diameter portion having a diameter smaller than the diameter of a remaining portion of the rolling elements,
the transfer path has a contact point changing path at which the first transfer groove partially has an elastic decelerating plate along the transfer direction of the rolling elements, in which the small diameter portion of the rolling elements contacts the decelerating plate,
the small diameter portion of each of the rolling elements comes in contact with the decelerating plate and the remaining portion of each of the rolling elements defines a first clearance with the first transfer groove in the contact point changing path, and a second clearance is defined between a central portion of the decelerating plate and a bottom portion of a groove so that elasticity of the decelerating plate presses the rolling elements with a force,
a frictional force acting between the decelerating plate of the first transfer groove and the small diameter portion of the rolling elements is greater than a frictional force acting between the second transfer groove and the rolling elements,
a radius from a rotation center of each of the rolling elements to a contact point between the decelerating plate and the small diameter portion of each of the rolling elements in the contact point changing path is smaller than a radius from the rotation center of each of the rolling elements to the contact point between the first transfer groove and each of the rolling elements in the remaining area of the transfer path, and
the device is a rolling bearing made up of at least an outer ring, an inner ring, the rolling elements, and the decelerating plate forming the contact point changing path, wherein the decelerating plate is loosely fitted with the outer ring or the inner ring elastically against a normal force.

\* \* \* \* \*

UNITED STATES PATENT AND TRADEMARK OFFICE
CERTIFICATE OF CORRECTION

| | | |
|---|---|---|
| PATENT NO. | : 8,783,958 B2 | Page 1 of 1 |
| APPLICATION NO. | : 12/600000 | |
| DATED | : July 22, 2014 | |
| INVENTOR(S) | : Sosuke Kawashima | |

It is certified that error appears in the above-identified patent and that said Letters Patent is hereby corrected as shown below:

In the Claims

Column 15, Line 6, Claim 1, delete "late" and insert -- plate --

Signed and Sealed this
Eighteenth Day of November, 2014

Michelle K. Lee
*Deputy Director of the United States Patent and Trademark Office*